United States Patent
Park et al.

(10) Patent No.: US 9,071,617 B2
(45) Date of Patent: Jun. 30, 2015

(54) METHOD AND APPARATUS FOR DISCLOSING PERSONAL NETWORK INFORMATION IN CONVERGED PERSONAL NETWORK SERVICE ENVIRONMENT

(75) Inventors: Sung-Jin Park, Gyeonggi-do (KR); Seok-Hoon Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 206 days.

(21) Appl. No.: 13/347,272

(22) Filed: Jan. 10, 2012

(65) Prior Publication Data

US 2012/0177056 A1 Jul. 12, 2012

(30) Foreign Application Priority Data

Jan. 10, 2011 (KR) ........................ 10-2011-0002124

(51) Int. Cl.
*H04L 29/06* (2006.01)
*H04L 12/28* (2006.01)

(52) U.S. Cl.
CPC .......... *H04L 63/105* (2013.01); *H04L 12/2834* (2013.01); *H04L 63/08* (2013.01)

(58) Field of Classification Search
CPC .............................. H04L 63/08; H04L 63/105
See application file for complete search history.

(56) References Cited

U.S. PATENT DOCUMENTS

| | | | |
|---|---|---|---|
| 2006/0268835 A1 | 11/2006 | Hyotylainen et al. | |
| 2010/0284390 A1 | 11/2010 | Lee et al. | |
| 2010/0293183 A1 | 11/2010 | Yaqub | |
| 2011/0090886 A1* | 4/2011 | Park et al. | 370/338 |
| 2011/0093704 A1* | 4/2011 | Park et al. | 713/168 |
| 2011/0149802 A1* | 6/2011 | Fok Ah Chuen et al. | 370/254 |
| 2011/0246605 A1* | 10/2011 | Yang et al. | 709/217 |
| 2011/0307620 A1* | 12/2011 | Park et al. | 709/229 |
| 2012/0051264 A1* | 3/2012 | Chien et al. | 370/254 |
| 2012/0108267 A1* | 5/2012 | Yang | 455/456.3 |
| 2012/0239733 A1* | 9/2012 | Deprun | 709/203 |

FOREIGN PATENT DOCUMENTS

WO  WO 2010/050643 A1 * 5/2010 .............. H04L 12/28

\* cited by examiner

*Primary Examiner* — Xavier Szewai Wong
(74) *Attorney, Agent, or Firm* — The Farrell Law Firm, P.C.

(57) ABSTRACT

A method for disclosing, by a Converged Personal Network Service (CPNS) server, Personal Network (PN) information in a CPNS environment is provided. The method includes receiving a PN registration request message including information indicating an information openness level of a Personal Network Entity (PNE), which has been transmitted from the PNE, from a Personal Network GateWay (PN GW) for PN registration of the PNE; checking and storing the information indicating the information openness level of the PNE from the PN registration request message; receiving a service search request message for requesting information regarding a CPNS service provided by the PNE from a predetermined PN GW connected to a predetermined PNE; and checking the information indicating the information openness level of the PNE and providing the information regarding the CPNS service provided by the PNE to the predetermined PNE via the predetermined PN GW.

20 Claims, 4 Drawing Sheets

METHOD AND APPARATUS FOR DISCLOSING PERSONAL NETWORK INFORMATION IN CONVERGED PERSONAL NETWORK SERVICE ENVIRONMENT

PRIORITY

This application claims priority under 35 U.S.C. §119(a) to a Korean Patent Application filed in the Korean Intellectual Property Office on Jan. 10, 2011 and assigned Serial No. 10-2011-0002124, the entire disclosure of which is incorporated herein by reference.

BACKGROUND OF THE INVENTION

1. Field of the Invention

The present invention relates generally to a communication method and apparatus, and more particularly, to a method and apparatus for performing communication in a Converged Personal Network Service (CPNS) environment.

2. Description of the Related Art

With the substantial increase in the use of Consumer Electronics (CEs) capable of short-range communication, e.g., MP3 players, Portable Multimedia Players (PMPs), and gaming terminals, many users would like to store content in their CEs in a simple way.

In general, a user searches for content available for a CE over the Internet using a Personal Computer (PC) and downloads the found content. Thereafter, the user connects the CE to the PC through a wired and wireless connection and downloads the secured content to the CE.

However, methods for CEs to access a long-range communication network directly are still quite limited. For example, some CEs can access a long-range communication network only if they can access the Internet using Wireless-Fidelity (Wi-Fi) in an area with an Access Point (AP). Accordingly, a method for devices that are capable of short-range communication but incapable of directly accessing a long-range communication network, i.e., CEs, to access the long-range communication network via a gateway to use a desired service, e.g., a content download service, is required.

The Converged Personal Network Service (CPNS) has been proposed to meet these requirements. CPNS refers to a service in which a CE that provides a desired service and plays content, receives the desired service and content over a long-range communication network via a device serving as a gateway communicating with the long-range communication network after constructing a Personal Network (PN) including the device serving as a gateway and the CE. In the CPNS, the device is called a Personal Network Gateway (PN GW), and the CE accessing a long-range communication network via the PN GW by being connected to the PN GW using short-range communication is called a Personal Network Entity (PNE).

In a CPNS service, in order to form a PN, information (e.g., device capability, service/content information, and the like) associated with elements that are a part of the PN, i.e., a PN GW and a PNE, is delivered to a CPNS server to be registered and stored in the CPNS server. By doing so, PNEs in a CPNS environment can share and use a service or content provided by each of the PNEs with one another.

To this end, when a single PNE (a requesting PNE) in the CPNS service requests the CPNS server to send it the requesting PNE information regarding a specific PN and a service or content provided by a PNE belonging to the specific PN (a provide PNE), the CPNS server checks the requested information regarding the specific PN and information regarding the service or content provided by the provide PNE and transmits the checked service or content to the requesting PNE.

As described above, a PNE transmits its service or content to a requesting PNE without checking authorization of the requesting PNE or permission of a user who has established or was in possession of a relevant PN, causing serious problems.

SUMMARY OF THE INVENTION

An aspect of the present invention is to substantially solve at least the above problems and/or disadvantages and to provide at least the advantages below. Accordingly, an aspect of the present invention is to provide a method and apparatus for controlling a openness level of information to be provided by a Personal Network Entity (PNE) when a Converged Personal Network Service (CPNS) service is provided.

Another aspect of the present invention is to provide a method and apparatus for providing information provided by a PNE after checking whether to grant the information provided by the PNE in a CPNS environment using the PNE or a Personal Network Gateway (PN GW).

According to one aspect of the present invention, a method for disclosing, by a Converged Personal Network Service (CPNS) server, Personal Network (PN) information in a CPNS environment is provided. The method includes receiving a PN registration request message including information indicating an information openness level of a Personal Network Entity (PNE), checking and storing the information indicating the information openness level of the PNE, receiving a service search request message for requesting information regarding the CPNS service provided by the PNE, and providing the information regarding the CPNS service to another PNE, according to the information openness level of the PNE, via a Personal Network Gateway (PN GW). wherein the PN GW is connected to the CPNS server, and the PNE is connected to the CPNS server via the PN GW.

According to another aspect of the present invention, a method for disclosing, by a Personal Network Gateway (PN GW), Personal Network (PN) information in a Converged Personal Network Service (CPNS) environment. The method includes receiving a PN setup request message including information indicating an information openness level of a Personal Network Entity (PNE) from the PNE; and transmitting a PN registration request message including the information indicating the information openness level of the PNE to a CPNS server, wherein the PN GW connected to the CPNS server, and the PNE connected to the CPNS server via the PN GW.

According to another aspect of the present invention, a method for disclosing, by a Personal Network Entity (PNE), Personal Network (PN) information in a Converged Personal Network Service (CPNS) environment is provided, the method includes generating a PN setup request message including information indicating an information openness level of a PNE; and transmitting the PN setup request message to a CPNS server via a Personal Network Gateway (PN GW), wherein the PN GW connected to the CPNS server, and the PNE connected to the CPNS server via the PN GW.

According to yet another aspect of the present invention, a Converged Personal Network Service (CPNS) server apparatus for disclosing Personal Network (PN) information in a CPNS environment is provided. The apparatus includes a communication unit for communicating with a Personal Network Entity (PNE) via a Personal Network Gateway (PN GW) based on a CPNS protocol, and a controller for controlling to check a PN registration request message including information indicating an information openness level of the PNE received from the PNE, to store the information indicating the information openness level of the PNE, to receive a service search request message for requesting information regarding a CPNS service provided by the PNE, and to provide the information regarding the CPNS service provided by the PNE to another PNE according to the information openness level of the PNE. wherein the PN GW connected to the CPNS server, and the PNE and the another PNE connected to the CPNS server via the PN GW According to another aspect of the present invention, a Personal Network Gateway (PN GW) apparatus for disclosing Personal Network (PN) information in a Converged Personal Network Service (CPNS) environment is provided. The apparatus includes a communication unit for performing a connection between a CPNS server and a Personal Network Entity (PNE); and a controller for receiving a PN setup request message including information indicating a PN setup request and information indicating an information openness level of the PNE from the PNE, generating a PN registration request message including the information indicating the information openness level of the PNE, and transmitting the PN registration request message to the CPNS server, wherein the PN information in the GPNS environment is disclosed in a system including the CPNS server for providing a CPNS service, the PN GW connected to the CPNS server, and the PNE connected to the CPNS server via the PN GW.

According to another aspect of the present invention, A Personal Network Entity (PNE) apparatus for disclosing Personal Network (PN) information in a Converged Personal Network Service (CPNS) environment is provided. The apparatus includes a communication unit for communicating with a CPNS server via the Personal Network Gateway (PN GW); and a controller for generating a PN setup request message including information indicating a PN setup request and information indicating an information openness level of the PNE and transmitting the PN setup request message to the CPNS server via the PN GW, wherein the GPNS environment is in a system including the CPNS server for providing a CPNS service, the PN GW connected to the CPNS server, and the PNE connected to the CPNS server via the PN GW.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF EMBODIMENTS OF THE PRESENT INVENTION

Hereinafter, embodiments of the present invention will be described with reference to the accompanying drawings. Throughout the drawings, the same elements will be designated by the same reference numerals.

Figure 1:
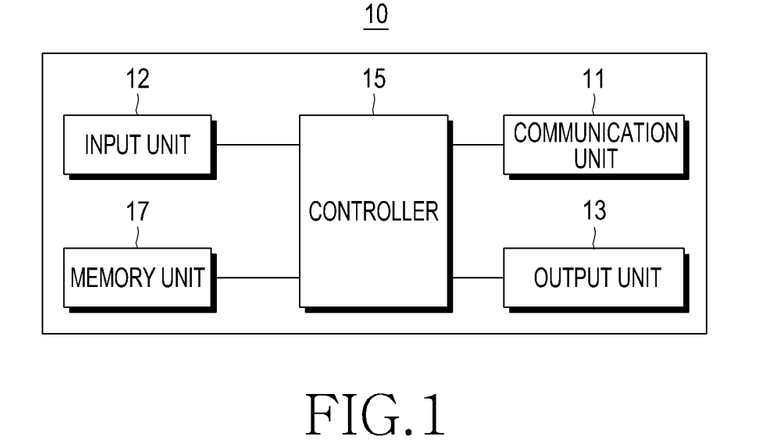
FIG. 1 is a block diagram of a PNE for processing a CPNS service, according to an embodiment of the present invention.

FIG. 1 is a block diagram of a PNE 10 for processing a CPNS service, according to an embodiment of the present invention. Referring to FIG. 1, the PNE 10 includes a communication unit 11, an input unit 12, an output unit 13, a controller 15, and a memory unit 17.

The communication unit 11 connects a PN GW (not shown) to a CPNS server (not shown). That is, the communication unit 11 communicates with the CPNS server via the PN GW based on the CPNS protocol, searches for a predetermined PNE storing content or a desired service, and communicates in order to receive the content or the desired service provided by the predetermined PNE.

The input unit 12 allows a user to input a telephone number or characters, has keys for inputting number and character information and function keys for setting various functions, and outputs an input signal to the controller 15. The input unit 12 may consist of a key button module, a keypad, or a touch-screen typically included in a CE.

The output unit 13 may include a display device, such as a Liquid Crystal Display (LCD), and display a message related to various operational states of the PNE 10, data stored in the memory unit 17, a user interface driven by the controller 15, or information and an image generated by an application program, under the control of the controller 15.

The memory unit 17 stores an application program for a core function of the PNE 10, an application program installed by a user, and the like. In particular, the memory unit 17 may store content, such as audio or video, produced by the PNE 10.

The controller 15 generally controls operations of the several units to control an overall operation of the PNE 10. That is, the controller 15 performs a process based on a key input, number, or menu selection signal input from the input unit 12, stores the application program for the core function of the PNE 10 in the memory unit 17, and processes an execution-requested application program. Moreover, the controller 15 stores the application program installed by the user in the memory unit 17 and reads and processes an application program in response to an execution request. Furthermore, the controller 15 stores content requested by the user in the memory unit 17 and reads and executes the content in response to an execution request of the content.

Specifically, the controller 15 controls the communication unit 11 to form a communication network included in a CPNS system (not shown) and provide content or a service stored in the memory unit 17 of the PNE 10.

Figure 2:
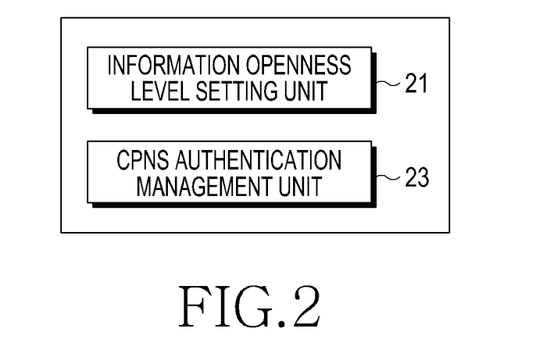
FIG. 2 is a block diagram of a controller of FIG. 1.

FIG. 2 is a block diagram illustrating functional units of the controller 15 of FIG. 1. That is, the controller 15 includes an information openness level setting unit 21 and a CPNS authorization management unit 23.

To form the communication network included in the CPNS system, the controller 15 may request the communication unit 11 for a connection to the CPNS server via the PN GW. The information openness level setting unit 21 may generate information about a openness level of content or a service stored in the memory unit 17 of the PNE 10 and provide the generated information to the communication unit 11. The openness level may mean a security level. Accordingly, the communication unit 11 may transmit a PN setup request message to the PN GW to form a PN. The communication unit 11 may insert the information regarding the openness level of the content or service into a Disclosure Attribute included in the PN setup request message. For example, the information regarding the openness level of the content or service may be illustrated as shown in Table 1.

TABLE 1

| Attribute | DataType | Description |
|---|---|---|
| Disclosure | Integer | The level of openness of PN Information<br>1 - Blocked: PN should not be disclosed.<br>2 - Open: PN will be disclosed, when other CPNS entities request service discovery.<br>3 - Confirm Mode: PN can be disclosed, only when the authorized CPNS entity allows. |

For example, the communication unit 11 may insert an integer, i.e., 1, 2, or 3, into the Disclosure Attribute included in the PN setup request message. Accordingly, the CPNS server may check the information in the Disclosure Attribute included in the PN setup request message and confirm the openness level of the content or service of the PNE 10. That is, when the value of the Disclosure Attribute is 1, the CPNS server recognizes that the content or service of the PNE 10 should not be disclosed. When the information in the Disclosure Attribute is 2, the CPNS server recognizes that the content or service of the PNE 10 should be disclosed. When the information in the Disclosure Attribute is 3, the CPNS server recognizes that the content or service of the PNE 10 may be disclosed through authentication of information included in an OwnershipEntity Attribute.

When there is a request for the PN to be formed, the CPNS authorization management unit 23 may generate information indicating an entity for checking whether to grant the CPNS service and provide the generated information to the communication unit 11. The communication unit 11 may insert the information indicating an entity for checking whether to grant the CPNS service into the OwnershipEntity Attribute included in the PN setup request message. For example, the information indicating an entity for checking whether to grant the CPNS service is shown in Table 2.

TABLE 2

| Attribute | DataType | Description |
|---|---|---|
| OwnershipEntity | String | The ID of authorized CPNS entity, which has authorization to allow PN Information to open. The default ID is the OriginEntityID to initiate the PN. |

For example, the communication unit 11 may insert an IDentification (ID) indicating an entity into the OwnershipEntity Attribute included in the PN setup request message. Such ID can then be used for checking whether to grant the CPNS service. Accordingly, when the content or service of the PNE 10 is conditionally disclosed through authentication, the CPNS server may check the OwnershipEntity Attribute included in the PN setup request message and transmit a message for an authentication request to an entity for performing the authentication of the content or service of the PNE 10.

When the CPNS authorization management unit 23 receives the message for an authentication request to an entity for performing the authentication of the content or service of the PNE 10 from the CPNS server, the CPNS authorization management unit 23 provides information regarding a requesting PNE. The requesting PNE requests the provision of the content or service of the PNE 10 to the user via the output unit 13 and receives an authentication result of the provision of the content or service of the PNE 10 via the input unit 12. The CPNS authorization management unit 23 then provides the authentication result to the communication unit 11 to request a response message including the authentication result be generated in response to the authentication request.

The PN GW included in the CPNS system may be configured with the same functional units as the PNE 10. However, the PN GW may perform a function of relaying a message between the PNE 10 and the CPNS server. To accomplish this, a communication unit (not shown) included in the PN GW receives a connection request to connect to the CPNS server from a PNE and connects the PNE to the CPNS server.

Figure 3:
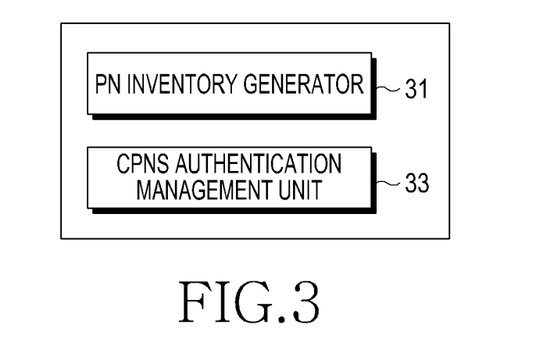
FIG. 3 is a block diagram of a controller of a PN GW, according to an embodiment of the present invention.

FIG. 3 is a block diagram of a controller of a PN GW for processing the CPNS service, according to an embodiment of the present invention. Referring to FIG. 3, the controller of the PN GW may include a PN inventory generator 31 for processing a message relayed between a PNE and a CPNS server.

The PN inventory generator 31 generates a PN inventory by aggregating information regarding a PNE requesting a connection to the CPNS server when a PN is formed.

Upon receiving a PN setup request message from a PNE, the PN GW transmits a PN registration request message to the CPNS server. The PN GW may detect information regarding a content or service openness level and information indicating an entity for checking whether to grant the CPNS service, which are included in the PN setup request message. The PN GW may further insert the information regarding the content or service openness level and the information indicating an entity for checking whether to grant the CPNS service into the PN registration request message.

The controller of the PN GW may further include a CPNS authorization management unit 33. If the information indicating an entity for checking whether to grant the CPNS service is not included in the PN setup request message received from the PNE or indicates the PN GW, the CPNS authorization management unit 33 may confirm an ID of the PN GW and provide the ID of the PN GW.

The CPNS authorization management unit 33 may also perform a function similar to that of the CPNS authorization management unit 23 of the PNE 10 of FIG. 2. That is, if the PN GW is designated as an entity for checking whether to grant the CPNS service in a message for an authentication request to an entity for performing authentication of content or a service of a PNE, which is received from the CPNS server, the CPNS authorization management unit 33 provides information regarding a requesting PNE requesting the provision of the content or service of the PNE to the user via an output unit (not shown) and receives an authentication result of the provision of the content or service of the PNE via an input unit (not shown). The CPNS authorization management unit 33 then provides the authentication result to the communication unit to request the generation of a response message including the authentication result in response to the message for an authentication request.

Figure 4:
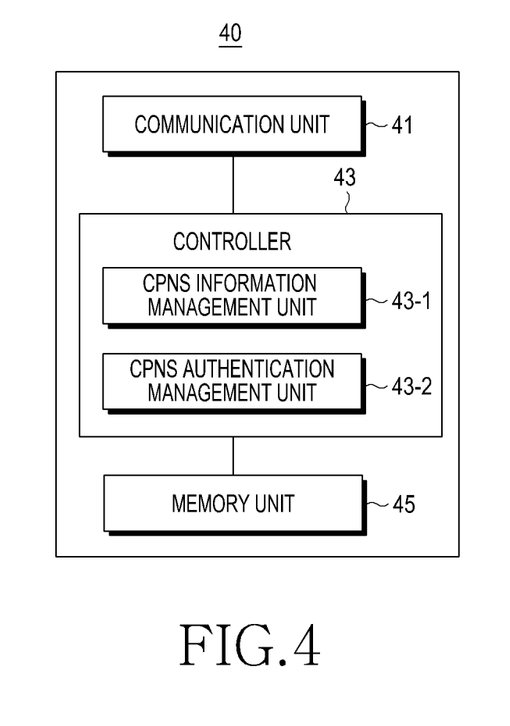
FIG. 4 is a block diagram of a CPNS server for processing the CPNS service, according to an embodiment of the present invention.

FIG. 4 is a block diagram of a CPNS server 40 for processing the CPNS service, according to an embodiment of the present invention. Referring to FIG. 4, the CPNS server 40 includes a communication unit 41, a controller 43, and a memory unit 45.

The communication unit 41 communicates with a PN GW or a PNE connected to the PN GW based on a CPNS protocol. That is, the communication unit 41 communicates with the PNE via the PN GW in order to provide a content or service requested from another PNE.

The controller 43 controls the functional units, i.e., the communication unit 41 and the memory unit 45, included in the CPNS server 40. Specifically, when the CPNS service is performed, the controller 43 manages information regarding a content or service openness level and performs the CPNS service in response to the information regarding a content or service openness level. Moreover, the controller 43 manages information indicating an entity for checking whether to grant the CPNS service, and if necessary, checks whether to grant the content or service from the entity for checking whether to grant the CPNS service. To accomplish the above, the controller 43 may include a CPNS information management unit 43-1 and a CPNS authentication management unit 43-2.

For each PNE, when a PN registration request message is received from a PN GW, the CPNS information management unit 43-1 detects information regarding a content or a service stored in a corresponding PNE, which is included in the PN registration request message, and stores the detected information in the memory unit 45 first of all.

Further, when the PN registration request message is received from the PN GW, the CPNS information management unit 43-1 checks information, i.e., a Disclosure Attribute, regarding a content or service openness level included in the PN registration request message. For each PNE, the CPNS information management unit 43-1 stores information included in the Disclosure Attribute in the memory unit 45.

When content or a service of a provide PNE is requested from a PNE requesting the content or service (a requesting PNE), the CPNS information management unit 43-1 checks information included in the Disclosure Attribute, which is stored in the memory unit 45, for the provide PNE. For example, if the information included in the Disclosure Attribute is 1, the CPNS information management unit 43-1 recognizes that the content or service of the provide PNE is not disclosed and instructs the communication unit 41 to generate a service search response message including information indicating that the content or service is not provided and transmit the service search response message to the requesting PNE. If the information included in the Disclosure Attribute is 2, the CPNS information management unit 43-1 recognizes that the content or service of the provide PNE is disclosed and instructs the communication unit 41 to confirm information regarding the content or service of the provide PNE, which is included in the PN registration request message and transmit a service search response message including the information regarding the content or service of the provide PNE to the requesting PNE.

If the information included in the Disclosure Attribute is 3, the CPNS information management unit 43-1 requests the CPNS authentication management unit 43-2 to perform authentication for granting the content or service of the provide PNE.

When the PN registration request message is received from the PN GW, the CPNS authentication management unit 43-2 stores information regarding an entity for performing the authentication of the content or service of the provide PNE, which is included in the PN registration request message, i.e., information included in an OwnershipEntity Attribute, in the memory unit 45. Then, if the CPNS information management unit 43-1 makes a call to the CPNS authentication management unit 43-2, the CPNS authentication management unit 43-2 performs the authentication for granting the content or service of the provide PNE. More specifically, the CPNS authentication management unit 43-2 confirms the information regarding an entity for performing the authentication of the content or service of the provide PNE and information regarding the requesting PNE, provides the information regarding the entity for performing the authentication and the information regarding the requesting PNE to the communication unit 41, and instructs the communication unit 41 to transmit a message for an authentication request of the content or service to the entity for performing the authentication. In response, the communication unit 41 performs a process for the authentication with the entity for performing the authentication.

Figure 5:
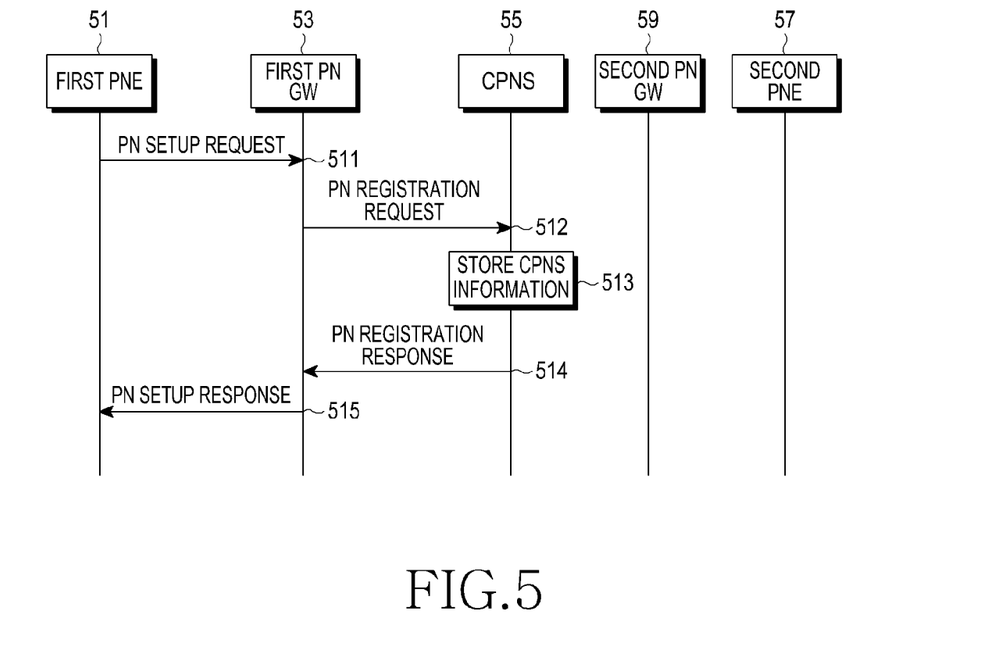
FIG. 5 is a sequence diagram illustrating a PN forming process in a CPNS-performing method, according to an embodiment of the present invention.

FIG. 5 is a sequence diagram illustrating a PN forming process in a CPNS-performing method, according to an embodiment of the present invention, which illustrates a process of forming a PN in a CPNS system including a CPNS server 55 for providing the CPNS service, a first PN GW 53 connected to the CPNS server 55, a first PNE 51 connected to the CPNS server 55 via the first PN GW 53.

Referring to FIG. 5, the first PNE 51 requests a connection to the CPNS server 55 via the first PN GW 53 to form a communication network in the CPNS system. In order to accomplish the above, the first PNE 51 may transmit a PN setup request message to the first PN GW 53 in step 511. The first PNE 51 may insert information regarding a openness level of content or a service stored therein into the PN setup request message. For example, the information regarding the content or service openness level may be illustrated as shown in Table 1. The PN setup request message may include information regarding the content or service stored in the first PNE 51.

In step 512, upon receiving the PN setup request message, the first PN GW 53 transmits a PN registration request message to the CPNS server 55. The first PN GW 53 may detect the information regarding the content or service openness level, which is included in the PN setup request message, and insert the information regarding the content or service openness level and into the PN registration request message.

In step 513, upon receiving the PN registration request message from the first PN GW 53, the CPNS server 55 detects the information regarding the content or service stored in the first PNE 51, which is included in the PN registration request message, and stores the detected information in a memory unit thereof. Moreover, the CPNS server 55 confirms the information, i.e., a Disclosure Attribute, regarding the content or service openness level, which is included in the PN registration request message, and stores information included in the Disclosure Attribute in the memory unit.

In step 514, the CPNS server 55 generates a PN registration response message including information indicating a PN registration completion and transmits the PN registration response message to the first PN GW 53. In step 515, the first PN GW 53 transmits the PN registration response message to the first PNE 51.

Moreover, in step 511 the first PNE 51 may further generate information indicating an entity for checking whether to grant the CPNS service and further insert the information indicating an entity for checking whether to grant the CPNS service into the PN setup request message. For example, the information indicating an entity for checking whether to grant the CPNS service, which is included in the PN setup request message, is shown in Table 2.

Accordingly, in step 512, the first PN GW 53 may further detect the information indicating an entity for checking whether to grant the CPNS service from the PN setup request message and transmit the PN registration request message further including the information indicating an entity for checking whether to grant the CPNS service to the CPNS server 55.

Additionally, in step 513, the CPNS server 55 may further detect the information indicating an entity for checking whether to grant the CPNS service from the PN registration request message and store the detected information indicating an entity for checking whether to grant the CPNS service in its memory unit.

Figure 6:
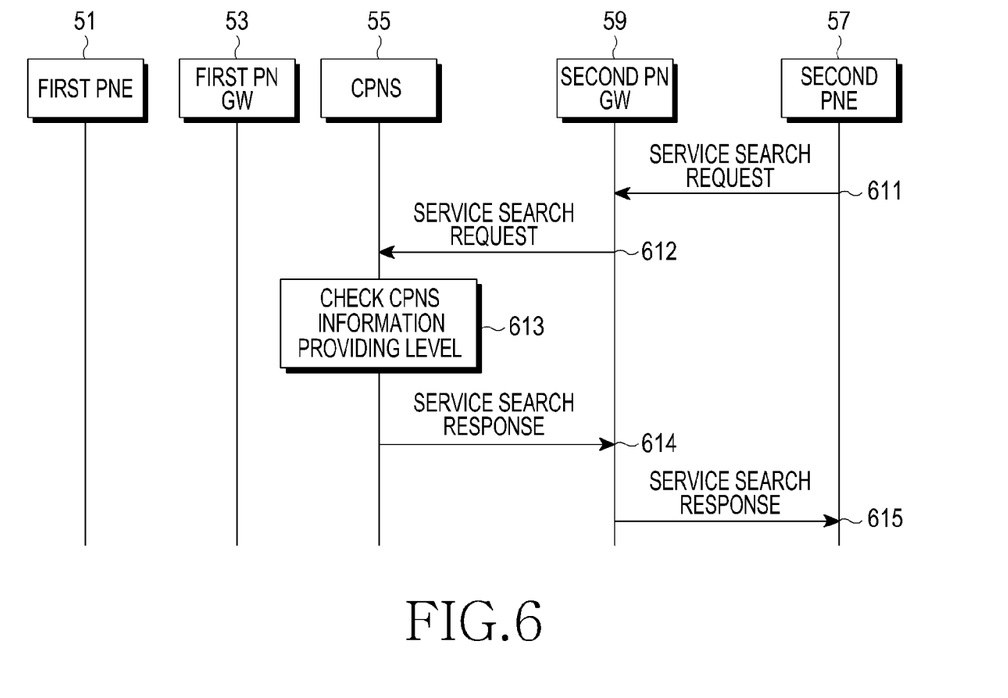
FIG. 6 is a sequence diagram illustrating a CPNS service providing process in the CPNS-performing method, according to an embodiment of the present invention.

FIG. 6 is a sequence diagram illustrating a CPNS-performing method according to an embodiment of the present invention, which illustrates a process of searching for content or a service by a second PNE 57 in the CPNS system.

Referring to FIG. 6, in steps 611 and 612, the second PNE 57 transmits a service search request message for requesting information regarding the content or service provided by the first PNE 51 to the CPNS server 55 via a second PN GW 59 in order to check what kind of content or service is provided by the first PNE 51.

In step 613, upon receiving the service search request message, the CPNS server 55 confirms the information stored in a memory unit thereof, i.e., the information included in the Disclosure Attribute of the first PNE 51. For example, if the information included in the Disclosure Attribute of the first PNE 51 is 1, the CPNS server 55 recognizes that the content or service of the first PNE 51 is not disclosed and generates a service search response message including information indicating that the first PNE 51 does not provide the content or service. If the information included in the Disclosure Attribute of the first PNE 51 is 2, the CPNS server 55 recognizes that the content or service of the first PNE 51 is disclosed and generates a service search response message including information regarding the content or service of the first PNE 51.

In step 614, the CPNS server 55 transmits the service search response message to the second PN GW 59. Finally, in step 615, the second PN GW 59 transmits the service search response message to the second PNE 57.

Figure 7:
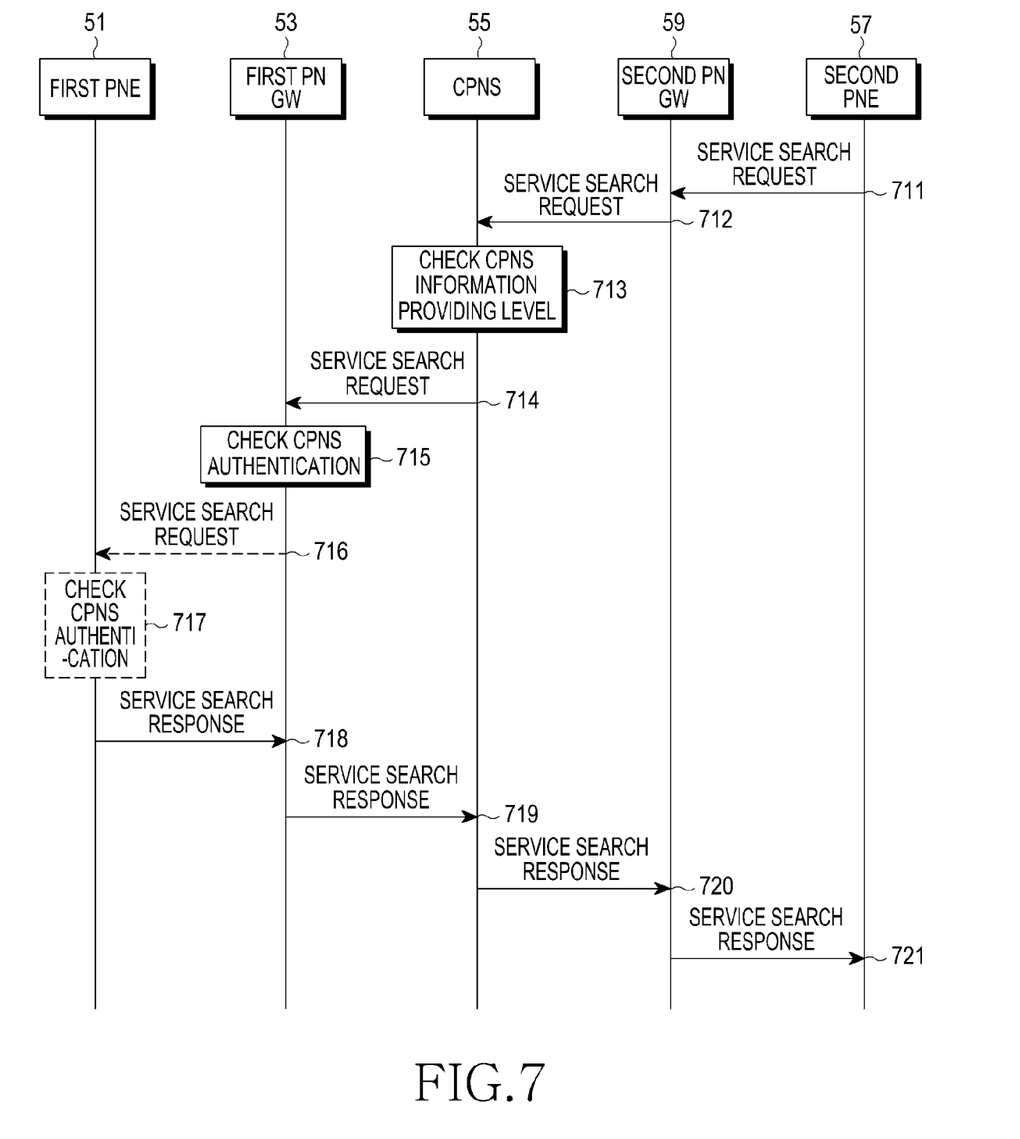
FIG. 7 is a sequence diagram illustrating a CPNS service providing process in the CPNS-performing method, according to another embodiment of the present invention.

FIG. 7 is a sequence diagram illustrating a CPNS-performing method according to another embodiment of the present invention, which further illustrates an authentication process of the providing content or service in the process of searching for the content or service in the second PNE 57.

Referring to FIG. 7, in steps 711 and 712, the second PNE 57 transmits a service search request message for requesting information regarding the content or service provided by the first PNE 51 to the CPNS server 55 via the second PN GW 59 in order to check for what kind of content or service is provided by the first PNE 51.

In step 713, upon receiving the service search request message, the CPNS server 55 confirms the information stored in a memory unit thereof, i.e., the information included in the Disclosure Attribute of the first PNE 51. For example, if the information included in the Disclosure Attribute of the first PNE 51 is 3, the CPNS server 55 recognizes that authority is determined based on an authentication process of the content or service of the first PNE 51.

In step 714, the CPNS server 55 confirms an ID indicating an entity for checking whether to grant the CPNS service, which is included in information, i.e., an OwnershipEnity Attribute, instructing an entity for checking whether to grant the CPNS service, and transmits an authentication request message to the entity (e.g., the first PN GW 53) corresponding to the ID.

In step 715, upon receiving the authentication request message, the first PN GW 53 checks whether the first PN GW 53 is the entity corresponding to the ID indicating an entity for checking whether to grant the CPNS service. If the first PN GW 53 is the entity corresponding to the ID, the first PN GW 53 provides information regarding the second PNE 57 requesting the provision of the content or service of the first PNE 51 to a user via an output unit thereof and receives an authentication result of the provision of the content or service of the first PNE 51 via an input unit thereof.

In step 718, based on the authentication result, the first PN GW 53 inserts information indicating the provision/non-provision of the content or service of the first PNE 51 to the second PNE 57 into a service search response message and transmits the service search response message to the CPNS server 55.

In steps 719 and 720, the CPNS server 55 checks the authentication result included in the service search response message. If the authentication result indicates the provision of the content or service of the first PNE 51 to the second PNE 57, the CPNS server 55 confirms the information regarding the content or service of the first PNE 51 stored therein, generates a service search response message including the information regarding the content or service of the first PNE 51, and transmits the service search response message to the second PNE 57 via the second PN GW 59.

If the first PN GW 53 checks that the first PNE 51 is the entity corresponding to the ID in step 715, the first PN GW 53 transmits the authentication request message received from the CPNS server 55 to the first PNE 51 in step 716.

In step 717, upon receiving the authentication request message from the first PN GW 53, the first PNE 51 provides the information regarding the second PNE 57 requesting the provision of the content or service of the first PNE 51 to the user via an output unit thereof and receives an authentication result of the provision of the content or service of the first PNE 51 via an input unit thereof.

In step 718, based on the authentication result, the first PNE 51 inserts information indicating the provision/non-provision of the content or service of the first PNE 51 to the second PNE 57 into a service search response message and transmits the service search response message to the first PN GW 53.

In step 719, the first PN GW 53 transmits the service search response message received from the first PNE 51 to the CPNS server 55.

In step 720, the CPNS server 55 checks the authentication result included in the service search response message. If the authentication result indicates the provision of the content or service of the first PNE 51 to the second PNE 57, the CPNS server 55 confirms the information regarding the content or service of the first PNE 51 stored therein, generates a service search response message including the information regarding the content or service of the first PNE 51, and transmits the service search response message to the second PNE 57 via the second PN GW 59.

In step 721, the second PN GW 59 transmits the service search response message to the second PNE 57.

According to the CPNS-performing method and apparatus, a openness level of information provided by a PNE may be controlled in providing the CPNS service.

Additionally, content or a service provided by a PNE may be provided by checking whether to grant the CPNS service by using the PNE or a PN GW.

While the invention has been shown and described with reference to certain embodiments thereof, it will be understood by those skilled in the art that various changes in form and detail may be made therein without departing from the spirit and scope of the invention as defined by the appended claims and their equivalents.

For example, in the embodiments illustrated in FIGS. 6 and 7, the service search request message may be transmitted by another PNE connected with PN GW 53. In this case, a method for disclosing, by a Converged Personal Network Service (CPNS) server, Personal Network (PN) information in a CPNS environment is provided. The method includes receiving a PN registration request message including information indicating an information openness level of a Personal Network Entity (PNE), checking and storing the information indicating the information openness level of the PNE, receiving a service search request message for requesting information regarding the CPNS service provided by the PNE, and providing the information regarding the CPNS service to another PNE, according to the information openness level of the PNE, via a Personal Network Gateway (PN GW). wherein the PN GW is connected to the CPNS server, and the PNE is connected to the CPNS server via the PN GW, An embodiment of the present invention includes the PN registration request message being received from the PNE for PN registration of the PNE, via the PN GW, and the PN registration request message further comprises information indicating an entity for checking whether to grant the CPNS service requested by the another PNE other than the PNE, An embodiment of the present invention includes providing the information regarding the CPNS service provided by the PNE including checking the information indicating an entity for checking whether to grant the CPNS service, requesting confirmation of whether to grant the CPNS service from the entity for checking whether to grant the CPNS service; and receiving a response message in response to the request for the confirmation of whether to grant the CPNS service, An embodiment of the present invention includes the entity for checking whether to grant the CPNS service including at least one of the PNE and the PN GW connected to the PNE, An embodiment of the present invention includes the response message being generated by the PNE that has confirmed whether to grant the CPNS service, An embodiment of the present invention includes the response message being generated by the PN GW that has confirmed whether to grant the CPNS service.

What is claimed is:

1. A method for disclosing, by a Converged Personal Network Service (CPNS) server, Personal Network (PN) information in a CPNS environment, the method comprising:
    receiving a PN registration request message including information indicating an information openness level of a Personal Network Entity (PNE), the information openness level including a security level of content stored in a memory of the PNE or a security level of a service stored in the memory of the PNE;
    determining the information indicating the information openness level of the PNE based on an authentication result of a provision of the content or service of the PNE, wherein the authentication result is received from an ownership entity;
    receiving a service search request message for requesting information regarding a CPNS service provided by the PNE; and
    providing the information regarding the CPNS service to another PNE, according to the information openness level of the PNE, via a Personal Network Gateway (PN GW),
    wherein the PN GW is connected to the CPNS server, and the PNE is connected to the CPNS server via the PN GW.

2. The method of claim 1, wherein the PN registration request message has been received from the PNE for PN registration of the PNE, via the PN GW, and the PN registration request message further comprises information indicating an entity for checking whether to grant the CPNS service requested by the another PNE other than the PNE.

3. The method of claim 2, wherein providing the information regarding the CPNS service provided by the PNE comprises:
    checking the information indicating an entity for checking whether to grant the CPNS service;
    requesting confirmation of whether to grant the CPNS service from the entity for checking whether to grant the CPNS service; and
    receiving a response message in response to the request for the confirmation of whether to grant the CPNS service.

4. The method of claim 3, wherein the entity for checking whether to grant the CPNS service includes at least one of the PNE and the PN GW connected to the PNE.

5. The method of claim 4, wherein the response message is generated by the PNE that has confirmed whether to grant the CPNS service.

6. The method of claim 4, wherein the response message is generated by the PN GW that has confirmed whether to grant the CPNS service.

7. A method for disclosing, by a Personal Network Gateway (PN GW), Personal Network (PN) information in a Converged Personal Network Service (CPNS) environment, the method comprising:
    receiving a PN setup request message including information indicating an information openness level of a Personal Network Entity (PNE) from the PNE, the information openness level including a security level of content stored in a memory of the PNE or a security level of a service stored in the memory of the PNE; and
    transmitting a PN registration request message including the information indicating the information openness level of the PNE to a CPNS server,
    wherein the PN GW is connected to the CPNS server, and the PNE is connected to the CPNS server via the PN GW, and
    wherein the information openness level is determined by determining, by the CPNS server, the information indicating the information openness level of the PNE based on an authentication result of a provision of the content or service of the PNE, wherein the authentication result is received from an ownership entity.

8. The method of claim 7, wherein the PN registration request message further comprises information indicating an entity for checking whether to grant the CPNS service requested by a predetermined PNE other than the PNE.

9. The method of claim 8, further comprising:
    receiving a service search request message from the CPNS server, which has received a request of information regarding the CPNS service provided by the PNE from the predetermined PNE other than the PNE.

10. The method of claim 9, further comprising:
    checking whether to grant the CPNS service in response to the received service search request message; and
    transmitting a response message including a checking result of whether to grant the CPNS service to the CPNS server.

11. The method of claim 10, wherein checking whether to grant the CPNS service further comprises:
    requesting confirmation of whether to grant the CPNS service from a user of the PN GW; and
    receiving a result of whether to grant the CPNS service.

12. The method of claim 10, wherein checking whether to grant the CPNS service further comprises:
    transmitting a message of requesting confirmation of whether to grant the CPNS service to the PNE; and
    receiving a result of whether to grant the CPNS service from the PNE.

13. A method for disclosing, by a Personal Network Entity (PNE), Personal Network (PN) information in a Converged Personal Network Service (CPNS) environment, the method comprising:
generating a PN setup request message including information indicating an information openness level of a PNE, the information openness level including a security level of content stored in a memory of the PNE or a security level of a service stored in the memory of the PNE; and
transmitting the PN setup request message to a CPNS server via a Personal Network Gateway (PN GW),
wherein the PN GW is connected to the CPNS server, and the PNE is connected to the CPNS server via the PN GW, and
wherein the information openness level is determined by determining, by the CPNS server, the information indicating the information openness level of the PNE based on an authentication result of a provision of the content or a service of the PNE, wherein the authentication result is received from an ownership entity.

14. The method of claim 13, wherein the PN setup request message further includes information indicating an entity for checking whether to grant the CPNS service requested by a predetermined PNE other than the PNE.

15. The method of claim 14, further comprising:
receiving a service search request message from the CPNS server, which has received a request of information regarding the CPNS service provided by the PNE from the predetermined PNE other than the PNE, via the PN GW.

16. The method of claim 15, further comprising:
checking whether to grant the CPNS service in response to the received service search request message; and
transmitting a response message including a checking result of whether to grant the CPNS service to the CPNS server via the PN GW.

17. The method of claim 16, wherein checking whether to grant the CPNS service further comprises:
requesting confirmation of whether to grant the CPNS service from a user of the PNE; and
receiving a result of whether to grant the CPNS service.

18. A Converged Personal Network Service (CPNS) server apparatus for disclosing Personal Network (PN) information in a CPNS environment, the apparatus comprising:
a communication unit for communicating with a Personal Network Entity (PNE) via a Personal Network Gateway (PN GW) based on a CPNS protocol; and
a controller for checking a PN registration request message including information indicating an information openness level of the PNE received from the PNE, storing the information indicating the information openness level of the PNE, receiving a service search request message for requesting information regarding a CPNS service provided by the PNE, and providing the information regarding the CPNS service provided by the PNE to another PNE according to the information openness level including a security level of content stored in a memory of the PNE or a security level of a service stored in the memory of the PNE,
wherein the PN GW is connected to the CPNS server, and the PNE and the another PNE are connected to the CPNS server via the PN GW, and
wherein the controller determines the information indicating the information openness level of the PNE based on an authentication result of a provision of the content or service of the PNE, wherein the authentication result is received from an ownership entity.

19. A Personal Network Gateway (PN GW) apparatus for disclosing Personal Network (PN) information in a Converged Personal Network Service (CPNS) environment, the apparatus comprising:
a communication unit for performing a connection between a CPNS server and a Personal Network Entity (PNE); and
a controller for receiving a PN setup request message including information indicating a PN setup request and information indicating an information openness level of the PNE from the PNE, generating a PN registration request message including the information indicating the information openness level of the PNE, and transmitting the PN registration request message to the CPNS server, the information openness level including a security level of content stored in a memory of the PNE or a security level of a service stored in the memory of the PNE,
wherein the PN information in the CPNS environment is disclosed in a system including the CPNS server for providing a CPNS service, the PN GW connected to the CPNS server, and the PNE connected to the CPNS server via the PN GW, and
wherein the information openness level is determined by determining, by the CPNS server, the information indicating the information openness level of the PNE based on an authentication result of a provision of the content or service of the PNE, wherein the authentication result is received from an ownership entity.

20. A Personal Network Entity (PNE) apparatus for disclosing Personal Network (PN) information in a Converged Personal Network Service (CPNS) environment, the apparatus comprising:
a communication unit for communicating with a CPNS server via the Personal Network Gateway (PN GW); and
a controller for generating a PN setup request message including information indicating a PN setup request and information indicating an information openness level of the PNE and transmitting the PN setup request message to the CPNS server via the PN GW, the information openness level including a security level of content stored in a memory of the PNE or a security level of a service stored in the memory of the PNE,
wherein the PN information in the GPNS environment is disclosed in a system including the CPNS server for providing a CPNS service, the PN GW connected to the CPNS server, and the PNE connected to the CPNS server via the PN GW, and
wherein the information openness level is determined by determining, by the CPNS server, the information indicating the information openness level of the PNE based on an authentication result of a provision of the content or service of the PNE, wherein the authentication result is received from an ownership entity.

* * * * *